United States Patent Office 2,913,345
Patented Nov. 17, 1959

2,913,345
OPHTHALMIC GLASS
James Earle Duncan, Brackenridge, Pa., assignor to Pittsburgh Plate Glass Company, Allegheny County, Pa., a corporation of Pennsylvania
No Drawing. Application December 20, 1954
Serial No. 476,557
14 Claims. (Cl. 106—52)

This invention relates to a novel glass and it has particular relation to a glass useful as the major portion of a multi-focal ophthalmic lens.

A multi-focal lens is formed of a major lens portion having a minor lens portion adhered in a recessed portion of the major lens portion. The major lens portion may be made of crown glass or other glass which is highly refined and free from seed, striae or other imperfections which would impair the optical properties of the lens. A crown glass for ophthalmic purposes is characterized by having the property of a relatively low index of refraction. One example of a crown glass is an alkali lime silicate glass.

The minor lens portion is usually made from highly refined glasses known as barium, lead, barium flint or barium crown glasses. The minor lens portion has a higher index of refraction than the major lens portion and it is the portion of the multi-focal lens used for reading. The glasses of the major and minor segments preferably have substantially the same coefficient of thermal expansion. The barium type glasses usually have a slightly lower softening point than the crown glasses and the flint glasses usually have a softening point considerably lower than that of the crown glasses.

In the manufacture of a multi-focal lens, the minor lens portion is fused to the major lens portion. There is a tendency for numerous minute gaseous bubbles to form at the interface of this fusion during the sealing or fusing of the two glasses. The reason for the formation of these bubbles at the interface is not definitely known. Some of the bubbles may be caused by entrapment of air at the interface during fusion. However, even when methods have been employed which insure that no air will be entrapped as the glasses are fused, gaseous bubbles are still formed. The gaseous bubbles may be due to the moisture content of the glasses or other gases which may be dissolved in the glass or may be due to some chemical interaction between the major and minor segment glasses not heretofore appreciated.

In accordance with the present invention a new major lens portion, crown type glass containing zinc oxide and titanium dioxide has been provided which seals to minor lens portion glasses such as barium glasses with a greatly reduced tendency towards the formation of bubbles at the interface between the glasses. The novel glasses are prepared by use of conventional glass making materials and they have the calculated compositions and properties set forth below:

The amounts of the various components of the glass may vary. The ranges set forth above describe approximate limitations which these variations may take and remain within the purview of the invention. For example, $SiO_2$ is employed in the glass as the principal glass former. If an amount greater than 73 percent by weight of $SiO_2$ is used, the glass is difficult to melt, whereas, if less than about 53 percent by weight $SiO_2$ is present, the durability of the glass is poor. The amount of the alkali metal oxides, $Na_2O$, $K_2O$ and $Li_2O$, is maintained between about 8 to 20 percent by weight. The alkali metal oxides are employed to aid melting of the glass and to obtain the most desirable thermal expansion properties.

It has been found most important to have zinc oxide and titanium dioxide present in the glass of the present invention in order to provide the interface between the fused major and minor lens portions as free from bubbles as possible. The ZnO should be between 5 and 18 percent by weight and the $TiO_2$ should be between 1.0 and 8 percent by weight. The ZnO and $TiO_2$ may be adjusted within these percentages to obtain a glass with good durability, the proper coefficient of expansion and the desired index of refraction and reciprocal dispersion.

The antimony oxide is present in the glass to serve as a fining agent. It is contemplated that other oxides such as arsenic oxide may be used in place of or in combination with antimony oxide as a fining agent in order to produce a refined glass suitable for optical purposes.

The novel glass described above is principally useful as the major portion of a multi-focal lens, however, it may be employed for other purposes where glasses having its particular properties are desired. The glass of the invention may be fused with any conventional barium or flint optical glass to form a multi-focal lens in accordance with conventional practices. For example, the glass set forth above in column 1 of the table may be fused with a barium glass having the following composition:

| Component: | Percent by weight |
|---|---|
| $SiO_2$ | 43.0 |
| $Na_2O$ | 6.1 |
| $K_2O$ | 1.9 |
| BaO | 30.9 |
| CaO | 4.5 |
| ZnO | 4.4 |
| $B_2O_3$ | 2.5 |
| $TiO_2$ | 2.9 |
| $ZrO_2$ | 3.4 |
| $As_2O_5$ | 0.4 |

A conventional practice is to form a composite button by fusing a glass of high index of refraction, i.e. 1.616, such as the barium glass set forth above and the glass of the present invention having a lower index of refraction of 1.5232 in edge to edge relationship. This button is then ground and polished to present a smooth, curved surface on one side thereof. The major lens portion, i.e. the glass of the present invention, is then formed with a

| Composition | 1 | 2 | 3 | 4 | 5 | 6 | 7 | 8 | Range | Preferred range |
|---|---|---|---|---|---|---|---|---|---|---|
| $SiO_2$ | 67.3 | 69.5 | 64.0 | 68.0 | 70.5 | 69.0 | 61.7 | 69.0 | 53 to 73 | 63 to 73 |
| $K_2O$ | 10.0 | 8.1 | 10.0 | 9.0 | 7.1 | 4.0 | 12.5 | 4.1 | 0 to 12 | 8 to 12 |
| $Na_2O$ | 8.0 | 9.9 | 8.3 | 7.3 | 9.9 | 12.3 | 5.8 | 12.9 | 5 to 15 | 6 to 10 |
| $Li_2O$ | | | | 1.0 | | | | | 0 to 5 | |
| ZnO | 11.5 | 7.7 | 14.5 | 11.5 | 5.0 | 11.5 | 18.0 | 5.0 | 5 to 18 | 10 to 15 |
| $TiO_2$ | 2.2 | 3.8 | 2.2 | 2.2 | 6.5 | 2.2 | 1.0 | 8.0 | 1 to 8 | 1.5 to 4 |
| $Sb_2O_5$ | 1.0 | 1.0 | 1.0 | 1.0 | 1.0 | 1.0 | 1.0 | 1.0 | 0 to 2 | 0 to 2 |
| Index of refraction $N_D$ | 1.5232 | 1.5249 | 1.5298 | 1.5261 | 1.5336 | 1.5229 | 1.5293 | 1.5427 | 1.52 to 1.55 | |
| Smear coefficient of thermal expansion $\times 10^{-6}$ per ° C. between 25° C. and 300° C | 9.8 | 9.5 | 9.9 | 10.0 | 9.0 | 9.3 | 10.0 | 9.1 | 9 to 10 | |
| Softening point, ° F. (temperature at which the log of the viscosity of the glass in poises is $10^{7.6}$) | 1,328 | 1,305 | 1,336 | 1,273 | 1,317 | 1,308 | 1,371 | 1,311 | | |
| Reciprocal dispersion $\left(\frac{N_D-1}{N_F-N_C}\right)$ | 55.4 | 53.6 | | 55.1 | | | 55.5 | | | | ground and polished recessed portion conforming to the ground and polished surface of the button. The button and the major lens portion are then brought together and heated to a temperature sufficient to fuse them together.

The use of a glass containing the specified amounts of zinc oxide and titanium dioxide in combination with the other ingredients of the glass as set forth above has enabled this fusion to be achieved with substantial freedom from the formation of bubbles at the interface between the lens portion. The exact reason for this reduction in the formation of bubbles is not known, however, it has been observed to be the fact.

Approximately 95 or more percent by weight of the glass which is the subject of this invention is comprised of $SiO_2$, alkali metal oxides, ZnO and $TiO_2$. The remaining approximately 5 percent or less by weight of the glass may be made up of fining agents, melting aids and other materials which may affect the transmission, absorption or other properties of the glass without materially influencing the desirable property of the glass which enables it to be fused to minor lens portion glasses with substantial freedom from the formation of bubbles at the interface.

Although the present invention has been described with respect to specific details of certain embodiments thereof, it is not intended that such details act as limitations upon the scope of the invention except insofar as included in the accompanying claims.

I claim:

1. A clear, colorless glass consisting essentially of 53 to 73 percent by weight of $SiO_2$, 8 to 20 percent by weight alkali metal oxide, 5 to 18 percent by weight ZnO and 1 to 8 percent by weight $TiO_2$, the above listed essential ingredients plus small amounts of impurities which do not impart color to the glass constituting 100 percent by weight of the glass.

2. A clear, colorless glass having an index of refraction, $N_D$, between 1.52 and 1.55 and a linear coefficient of thermal expansion between 9 to $10 \times 10^{-6}$ per °C. between 25° C. and 300° C. consisting essentially of 53 to 73 percent by weight $SiO_2$, 8 to 20 percent by weight alkali metal oxide, 5 to 18 percent by weight ZnO and 1 to 8 percent by weight $TiO_2$, the above listed essential ingredients plus small amounts of impurities which do not impart color to the glass constituting 100 percent by weight of the glass.

3. A clear, colorless glass consisting essentially of 63 to 73 percent by weight $SiO_2$, 8 to 20 percent by weight alkali metal oxide, 10 to 15 percent by weight ZnO and 1.5 to 4 percent by weight $TiO_2$, the above listed essential ingredients plus small amounts of impurities which do not impart color to the glass constituting 100 percent by weight of the glass.

4. A clear colorless glass consisting essentially of 63 to 73 percent by weight $SiO_2$, 8 to 12 percent by weight $K_2O$, 6 to 10 percent by weight $Na_2O$, 10 to 15 percent by weight ZnO and 1.5 to 4 percent by weight $TiO_2$, the above listed essential ingredients plus small amounts of impurities which do not impart color to the glass constituting 100 percent by weight of the glass.

5. A clear, colorless glass consisting essentially of 63 to 73 percent by weight $SiO_2$, 8 to 12 percent by weight $K_2O$, 6 to 10 percent by weight $Na_2O$, 10 to 15 percent by weight ZnO and 1.5 to 4 percent by weight $TiO_2$ and 0 to 2 percent refining agent, the above listed essential ingredients plus small amounts of impurities which do not impart color to the glass constituting 100 percent by weight of the glass.

6. A multi-focal lens comprising a minor lens portion fused to a major lens portion, the major lens portion being composed of a clear, colorless glass consisting essentially of 53 to 73 percent by weight $SiO_2$, 8 to 20 percent by weight alkali metal oxide, 5 to 18 percent by weight ZnO and 1 to 8 percent by weight $TiO_2$, the above listed essential ingredients plus small amounts of impurities which do not impart color to the glass constituting 100 percent by weight of the glass.

7. A multi-focal lens comprising a minor lens portion and a major lens portion, the major lens portion being composed of a clear, colorless glass having an index of refraction, $N_D$, between 1.52 and 1.55 and a linear coefficient of thermal expansion between 9 to $10 \times 10^{-6}$ per °C. between 25° C. and 300° C. consisting essentially of 53 to 73 percent by weight $SiO_2$, 8 to 20 percent by weight alkali metal oxide, 5 to 18 percent by weight ZnO, and 1 to 8 percent by weight $TiO_2$, the above listed essential ingredients plus small amounts of impurities which do not impart color to the glass constituting 100 percent by weight of the glass.

8. A multi-focal lens comprising a minor lens portion and a major lens portion, the major lens portion being composed of a clear, colorless glass consisting essentially of 63 to 73 percent by weight $SiO_2$, 8 to 20 percent by weight alkali metal oxide, 10 to 15 percent by weight ZnO and 1.5 to 4 percent by weight $TiO_2$, the above listed essential ingredients plus small amounts of impurities which do not impart color to the glass constituting 100 percent by weight of the glass.

9. A multi-focal lens comprising a minor lens portion fused to a major lens portion, the major lens portion being composed of a clear, colorless glass consisting essentially of 53 to 73 percent by weight $SiO_2$, 8 to 20 percent by weight alkali metal oxide, 5 to 18 percent by weight ZnO and 1 to 8 percent by weight $TiO_2$, the above listed essential ingredients plus small amounts of impurities which do not impart color to the glass constituting 100 percent by weight of the glass and the minor lens portion being composed of a barium glass.

10. A multi-focal lens comprising a minor lens portion fused to a major lens portion, the major lens portion being composed of a clear, colorless glass consisting essentially of 53 to 73 percent by weight $SiO_2$, 8 to 20 percent by weight alkali metal oxide, 5 to 18 percent by weight ZnO and 1 to 8 percent by weight $TiO_2$, the above listed essential ingredients plus small amounts of impurities which do not impart color to the glass constituting 100 percent by weight of the glass and the minor lens portion being composed of a flint glass.

11. A multi-focal lens comprising a minor lens portion fused to a major lens portion, the major lens portion being composed of a clear, colorless glass consisting essentially of 53 to 73 percent by weight $SiO_2$, 8 to 20 percent by weight alkali metal oxide, 5 to 18 percent by weight ZnO and 1 to 8 percent by weight $TiO_2$, the above listed essential ingredients plus small amounts of impurities which do not impart color to the glass constituting 100 percent by weight of the glass and the minor lens portion being composed of a barium flint glass.

12. A multi-focal lens comprising a minor lens portion fused to a major lens portion, the major lens portion being composed of a clear, colorless glass consisting essentially of 53 to 73 percent by weight $SiO_2$, 8 to 20 percent by weight alkali metal oxide, 5 to 18 percent by weight ZnO and 1 to 8 percent by weight $TiO_2$, the above listed essential ingredients plus small amounts of impurities which do not impart color to the glass constituting 100 percent by weight of the glass and the minor lens portion being composed of a barium crown glass.

13. A multi-focal lens comprising a minor lens portion fused to a major lens portion, the major lens portion being composed of a clear, colorless glass having the following approximate composition: 67.3 percent by weight $SiO_2$, 10 percent by weight $K_2O$, 8 percent by weight $Na_2O$, 11.5 percent by weight ZnO, 2.2 percent by weight $TiO_2$ and 1 percent by weight fining agent.

14. A clear, colorless glass composed of the following ingredients in percent by weight: 67.3 percent $SiO_2$, 10 percent $K_2O$, 8 percent $Na_2O$, 11.5 percent ZnO, 2.2 percent $TiO_2$ and 1 percent fining agent.

(References on following page)

References Cited in the file of this patent

UNITED STATES PATENTS

| | | |
|---|---|---|
| 1,957,116 | Tillyer | May 1, 1934 |
| 1,957,117 | Tillyer | May 1, 1934 |
| 2,435,995 | Armistead | Feb. 17, 1948 |
| 2,523,264 | Armistead | Sept. 26, 1950 |
| 2,523,265 | Armistead | Sept. 26, 1950 |
| 2,523,362 | Fraser et al. | Sept. 26, 1950 |
| 2,688,560 | Armistead | Sept. 7, 1954 |
| 2,688,561 | Armistead | Sept. 7, 1954 |

UNITED STATES PATENT OFFICE
CERTIFICATE OF CORRECTION

Patent No. 2,913,345                                    November 17, 1959

James Earle Duncan

It is hereby certified that error appears in the printed specification of the above numbered patent requiring correction and that the said Letters Patent should read as corrected below.

Columns 1 and 2, in the table, first column thereof, under the heading "Composition", ninth line, for "Smear" read -- Linear --.

Signed and sealed this 27th day of September 1960.

(SEAL)
Attest:

KARL H. AXLINE                                    ROBERT C. WATSON
Attesting Officer                               Commissioner of Patents